(12) United States Patent
Thomson et al.

(10) Patent No.: US 6,964,215 B2
(45) Date of Patent: Nov. 15, 2005

(54) ROTARY POSITIONING MULTI-FACED TOOLING FIXTURE AND ASSOCIATED METHODS

(75) Inventors: Loronzo H. Thomson, Byron, GA (US); Kinito S. Swader, Forsyth, GA (US); Randy D. Tolbert, Macon, GA (US)

(73) Assignee: L. H. Thomson Company, Inc., Macon, GA (US)

( * ) Notice: Subject to any disclaimer, the term of this patent is extended or adjusted under 35 U.S.C. 154(b) by 341 days.

(21) Appl. No.: 10/191,794

(22) Filed: Jul. 9, 2002

(65) Prior Publication Data

US 2003/0017041 A1 Jan. 23, 2003

Related U.S. Application Data

(60) Provisional application No. 60/303,974, filed on Jul. 9, 2001.

(51) Int. Cl.$^7$ ............................................ G05G 11/00
(52) U.S. Cl. ........................................ 74/813 R; 74/89
(58) Field of Search ...................... 74/813 R, 89–89.22

(56) References Cited

U.S. PATENT DOCUMENTS

| | | | |
|---|---|---|---|
| 3,552,240 A | 1/1971 | Wüsteney et al. | |
| 4,014,439 A | 3/1977 | Kochsiek et al. | |
| 4,317,560 A | 3/1982 | Troyer | 266/48 |
| 4,422,265 A * | 12/1983 | Branston | 451/147 |
| 4,502,457 A | 3/1985 | Marron | 125/11 A |
| 4,608,747 A | 9/1986 | Link et al. | 29/568 |
| 4,726,577 A | 2/1988 | Pontis | 269/71 |
| 4,787,128 A * | 11/1988 | Wickham | 29/33 P |
| 4,842,457 A * | 6/1989 | Badagnani | 409/183 |
| 4,848,039 A | 7/1989 | Kummer | 51/281 R |
| 4,860,414 A | 8/1989 | Bishop et al. | 29/38 C |
| 4,901,991 A | 2/1990 | Bonkowski | 269/234 |
| 5,429,345 A | 7/1995 | Yang | 269/71 |
| 5,452,502 A | 9/1995 | Walter et al. | 29/38 B |
| 5,489,089 A | 2/1996 | Vollrath et al. | 264/71 |
| 5,501,119 A * | 3/1996 | Yanagisawa | 74/490.09 |
| 5,720,088 A | 2/1998 | Riello et al. | 29/38 V |
| 5,735,514 A | 4/1998 | Moore et al. | 269/43 |
| 5,984,291 A | 11/1999 | Iwata et al. | 269/73 |
| 6,164,173 A | 12/2000 | Crudgington et al. | 82/1.11 |
| 6,185,802 B1 | 2/2001 | Gruber et al. | 29/38 R |
| 6,203,478 B1 | 3/2001 | Gorrochategui | 483/31 |
| 6,220,116 B1 | 4/2001 | Warner | 74/813 |

* cited by examiner

*Primary Examiner*—Janice L. Krizek
(74) *Attorney, Agent, or Firm*—Allen, Dyer, Doppelt, Milbrath & Gilchrist, P.A.

(57) ABSTRACT

A tooling fixture for rotatably positioning a plurality of workpieces includes a base and a housing carried by the base. A plurality of workpiece spindles are carried by the housing. The tooling fixture also includes a spindle drive assembly for rotatably positioning the workpiece spindles. The spindle drive assembly includes a body movable along a predetermined path of travel between first and second spaced-apart positions within the housing, and converter members for converting movement of the body along the predetermined path of travel into rotation of the workpiece spindles.

41 Claims, 8 Drawing Sheets

ROTARY POSITIONING MULTI-FACED TOOLING FIXTURE AND ASSOCIATED METHODS

RELATED APPLICATIONS

The present application is based upon provisional patent application Ser. No. 60/303,974 filed on Jul. 9, 2001, the entire contents of which are incorporated herein by reference.

FIELD OF THE INVENTION

The present invention relates to the field of tooling fixtures, and more particularly, to a rotary positioning tooling fixture and associated methods.

BACKGROUND OF THE INVENTION

It is of importance to increase the efficiency of operations on multiple workpieces which are similar to or different from each other, and are clamped on a tooling fixture. Such workpieces can be made in small, intermediate or large series in computer numerically controlled (CNC) work centers, or can be worked on with multi-spindle machines.

Auxiliary or lateral time periods associated with the efficiency of operations on multiple workpieces include the time required for supplying the workpieces, clamping them, re-clamping them in a different position if necessary, and removing the workpieces. These auxiliary time periods form a cost factor which becomes increasingly important as the initial preparation of the workpieces themselves becomes more accurate, thus requiring little re-working.

The operations performed on multiple workpieces generally require a high degree of accuracy. Any minor inaccuracy may be compounded when performing operations on multiple workpieces. Such inaccuracies may include the position of multiple workpieces that may be secured in a multiple workpiece clamping device.

One such device is illustrated in U.S. Pat. No. 6,185,802 to Gruber et al. The device described in Gruber et al. rotates a plurality of workpieces using a combination of three gears. Unfortunately, such a gear drive arrangement may suffer from inaccuracies in positioning.

U.S. Pat. No. 4,860,414 to Bishop et al. discloses an indexing and transporting device including a plurality of workpiece spindles spaced on a carousel. The spindles are indexed together using four-lobe geneva wheels and geneva drive pins incorporated in gears which, in turn, are driven through idlers from a gear mounted on a drive shaft. Again, the spindle drive arrangement may also produce inaccuracies. Also, re-clamping the workpieces in a different position is further time-consuming, and introduces the possibility of errors in the positions of the workpieces after re-clamping.

SUMMARY OF THE INVENTION

In view of the foregoing background, it is therefore an object of the present invention to provide a tooling fixture that can precisely rotate a plurality of workpieces throughout a desired range.

This and other objects, features and advantages in accordance with the present invention are provided by a tooling fixture comprising a base, a housing carried by the base, and a plurality of workpiece spindles carried by the housing. The tooling fixture may also include a spindle drive assembly for rotatably positioning the workpiece spindles. The spindle drive assembly may include a body movable along a predetermined path of travel between first and second spaced-apart positions within the housing. The spindle drive assembly may further include a respective converter member for converting movement of the body along the predetermined path of travel into rotation of each workpiece spindle. Very reliable and precise rotational positioning of the spindles is therefore achieved in a compact arrangement.

The spindle drive assembly may drive the workpiece spindles to rotate in unison through a range of about 90 degrees, and may further comprise at least one guide extending within the housing for guiding the body along the predetermined path of travel. Each converter member may comprise a crank arm connected to the respective workpiece spindle. Additionally, the body may have at least one recess formed therein. Each converter member may further comprise a shoe movable within the at least one recess and connected to a second end of the respective crank arm. The at least one recess may be an elongate recess extending transverse to the predetermined path of travel. This arrangement helps provide the reliable and accurate rotational positioning.

The tooling fixture may also include a plurality of workpiece spindle mounts rotatably mounting respective workpiece spindles to the housing. The housing may have a plurality of first lubrication passageways extending therein to lubricate the workpiece spindles. Each converter member may include a second lubrication passageway therein for lubricating the spindle drive assembly. Accordingly, the tooling fixture may be lubricated without requiring extensive disassembly.

The tooling fixture may further include at least one position sensor for sensing at least one rotational position of the plurality of workpiece spindles. The position sensor may include at least one fluid nozzle within the housing for directing a flow of fluid outwardly therefrom and toward at least one predetermined portion of the spindle drive assembly. The position sensor may also include a pressure sensor connected in fluid communication upstream from the fluid nozzle. A change in the pressure then indicates whether the nozzle is blocked or open, thus indicating the position of the spindle.

The housing may include an actuator therein to move the body along the predetermined path of travel. The actuator may comprise at least one hydraulic cylinder, for example.

A method aspect of the present invention is for rotatably positioning a plurality of workpieces secured to workpiece spindles. The workpiece spindles may be rotatably mounted on a housing of a tooling fixture. The method may include moving a body along a predetermined path of travel between first and second spaced-apart positions within the housing. The method may also include converting movement of the body along the predetermined path of travel into rotation of the workpiece spindles.

DETAILED DESCRIPTION OF THE PREFERRED EMBODIMENTS

Figure 1:
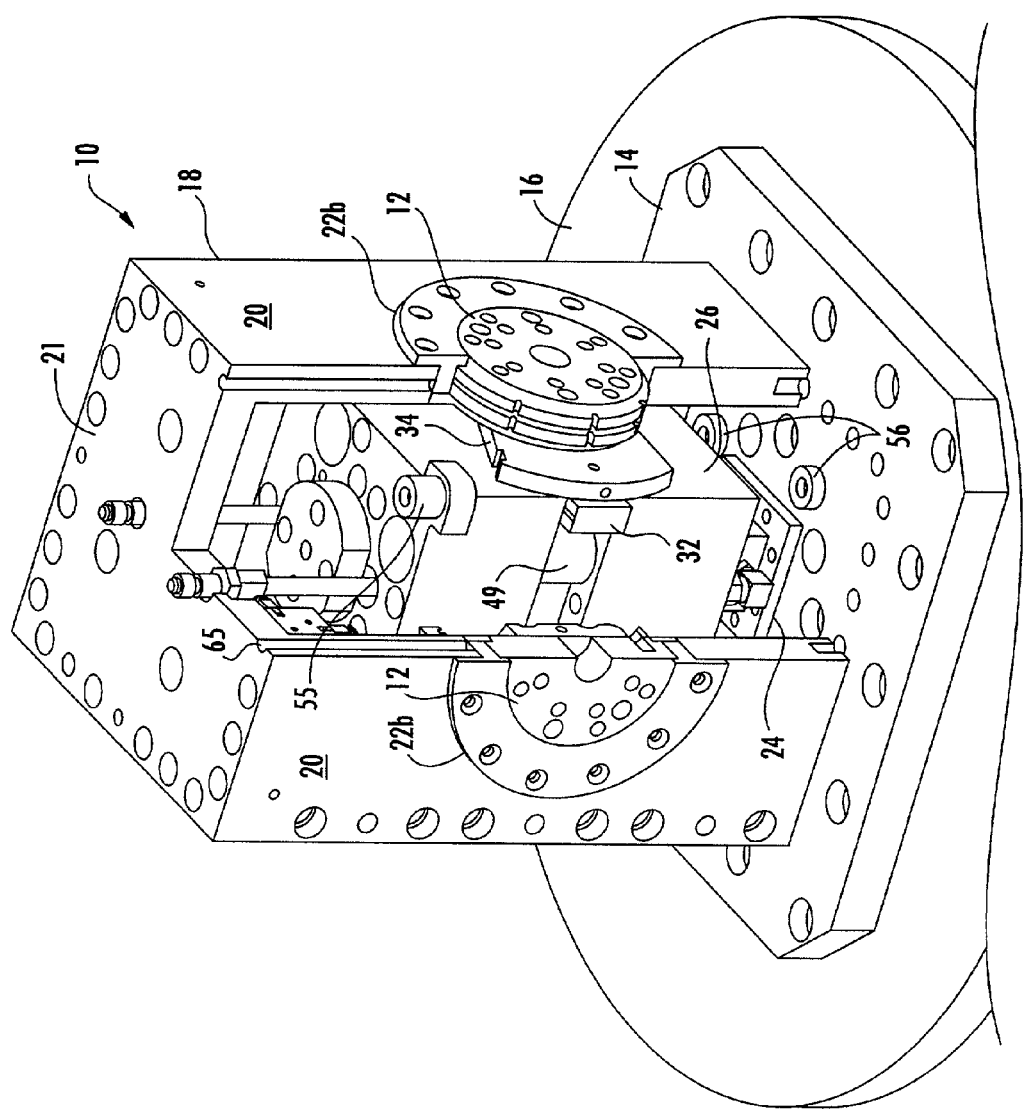
FIG. 1 is a partial cut-away perspective view of a tooling fixture in accordance with the present invention.

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1–6, a tooling fixture 10 in accordance with the present invention will now be described. The illustrated tooling fixture 10 includes a base 14. The base 14 may illustratively be carried by a rotary turntable 16 as is conventional for a computer numerically controlled (CNC) machining center. The tooling fixture 10 includes a housing 18 that is carried by the base 14. The housing 18 illustratively includes a plurality of housing sidewalls 20 extending outwardly from the base 14 and a top 21 connected at an upper end of the sidewalls.

The tooling fixture 10 includes a plurality of workpiece spindles 12 carried by the housing 18. More particularly, each of the workpiece spindles 12 is carried by one of the plurality of sidewalls 20 of the housing 18. The illustrated housing 18 is four-sided and includes a workpiece spindle 12 on each of the four sides thereof. Although a four-sided housing 18 is illustrated, those skilled in the art will appreciate that the housing may include a plurality of sides greater than or less than four, e.g., a three-sided or five-sided housing. In addition, although a single spindle 12 is shown on each sidewall 20 of the housing, two or more such spindles could be carried on a given sidewall of the housing in other embodiments.

The tooling fixture 10 also illustratively includes a spindle drive assembly 50 for rotatably positioning the workpiece spindles 12. The spindle drive assembly 50 comprises a body 26 movable along a predetermined path of travel between first and second spaced-apart positions within the housing 18. In the illustrated embodiment, the first and second positions are at the top and bottom within the housing 18.

The spindle drive assembly 50 also includes converter members 52 for converting movement of the body 26 along the predetermined path of travel into rotation of the workpiece spindles 12. More particularly, the spindle drive assembly 50 drives the workpiece spindles 12 to rotate in unison through a range of about 90 degrees. As will be appreciated by those skilled in the art, the workpiece spindles 12 may also be rotated through any angle if desired. The illustrated spindle drive assembly 50 could also rotate the spindles up to about 110 degrees, although in other embodiments the rotation could be greater than or less than these figures.

The spindle drive assembly 50 illustratively includes four guides 28 extending within the housing 18 for guiding the body 26 along the predetermined path of travel. Each guide 28 is in the form of a rod. Moreover, a pair of upper and lower ball bushings 48 may be received in respective upper and lower corners of the body 26 to enhance relative sliding movement with the corresponding guide, a lower such bushing 48 being shown in the exploded view of FIG. 5. Other low friction bushings are also contemplated by the invention as will be appreciated by those skilled in the art. A spacer tube 49 (FIG. 1) may be provided between the upper and lower ball bushings 48.

The tooling fixture 10 also includes an actuator within the housing 18 to move the body 26 along the predetermined path of travel. The actuator may be at least one hydraulic cylinder 24. Fluid pressure may be supplied to the hydraulic cylinder 24 to apply force to the body 26 and thereby move it along the predetermined path of travel. The hydraulic cylinder 24 may be of a type including cushions to slow its advancement at one or more of its positional extremes, as will be appreciated by those skilled in the art. In some embodiments, the hydraulic cylinder 24 or other actuator could include portions thereof that serve as the guide or guides described above, and as will be also appreciated by those skilled in the art. In addition, at each of the corners of the upper and lower ends of the body 26, button stops 55 may be provided which engage corresponding button stops 56 on the base (FIG. 1) and upper surface (not shown) of the housing, respectively.

In other embodiments of the tooling fixture 10, the hydraulic cylinder 24 may be replaced by a ball screw and motor, or other servo-controlled actuator, for providing an essentially infinite angular adjustment. Accordingly, the recitation of first and second spaced-apart positions is also meant to encompass an infinite adjustment of spaced-apart positions as will be appreciated by those skilled in the art.

The converter members 52 each include a crank arm 34 connected to a respective workpiece spindle 12. The body 26 illustratively includes a recess 30 formed in a medial portion of each face of the body. Each converter member 52 further comprises a shoe 32 moveable within the recess 30 and connected to a second end of a respective crank arm. The crank arm 34 includes a crank 38 that rotates inside an opening 40 in the shoe 32.

The recess 30 is an elongate recess that extends transverse to the predetermined path of travel of the body 26. The predetermined path of travel of the body 26 in the illustrated embodiment is generally vertical and the path of travel of the shoes 32 are generally horizontal within the recess.

The tooling fixture also includes a plurality of workpiece spindle mounts 22 rotatably mounting respective workpiece spindles 12 to the housing. More specifically, each workpiece spindle mount 22 illustratively includes a pair of workpiece spindle mounts 22a, 22b. A first one of the pair of workpiece spindle mounts 22a includes a flange which is connected adjacent an outer surface of the sidewall 20 of the housing 18, and a second one of the pair of workpiece spindle mounts 22b is connected to the first mount thereby holding the spindle 12 therebetween as will be appreciated by those skilled in the art. Other mounting arrangements are also contemplated by the present invention.

The motion of the body 26 along the predetermined path of travel is translated into rotational motion of the workpiece spindles 12 by the converter members 52. More specifically, linear motion of the body 26 is translated into rotational movement of the workpiece spindles 12 through cooperative action of the shoe 32, the crank arm 34, and the crank 38. In the illustrated embodiment, each sidewall 20 of the housing 18 has associated therewith a workpiece spindle, a crank arm 34, a crank 38 and a shoe 32 connected to the body 26 to rotate the respective workpiece spindle 12. Only one actuator 24 and body 26 are used in this embodiment for operation of the multiple workpiece spindles 12 of the tooling fixture 10. Accordingly, a very compact tooling fixture 10 is advantageously provided.

Figure 2:
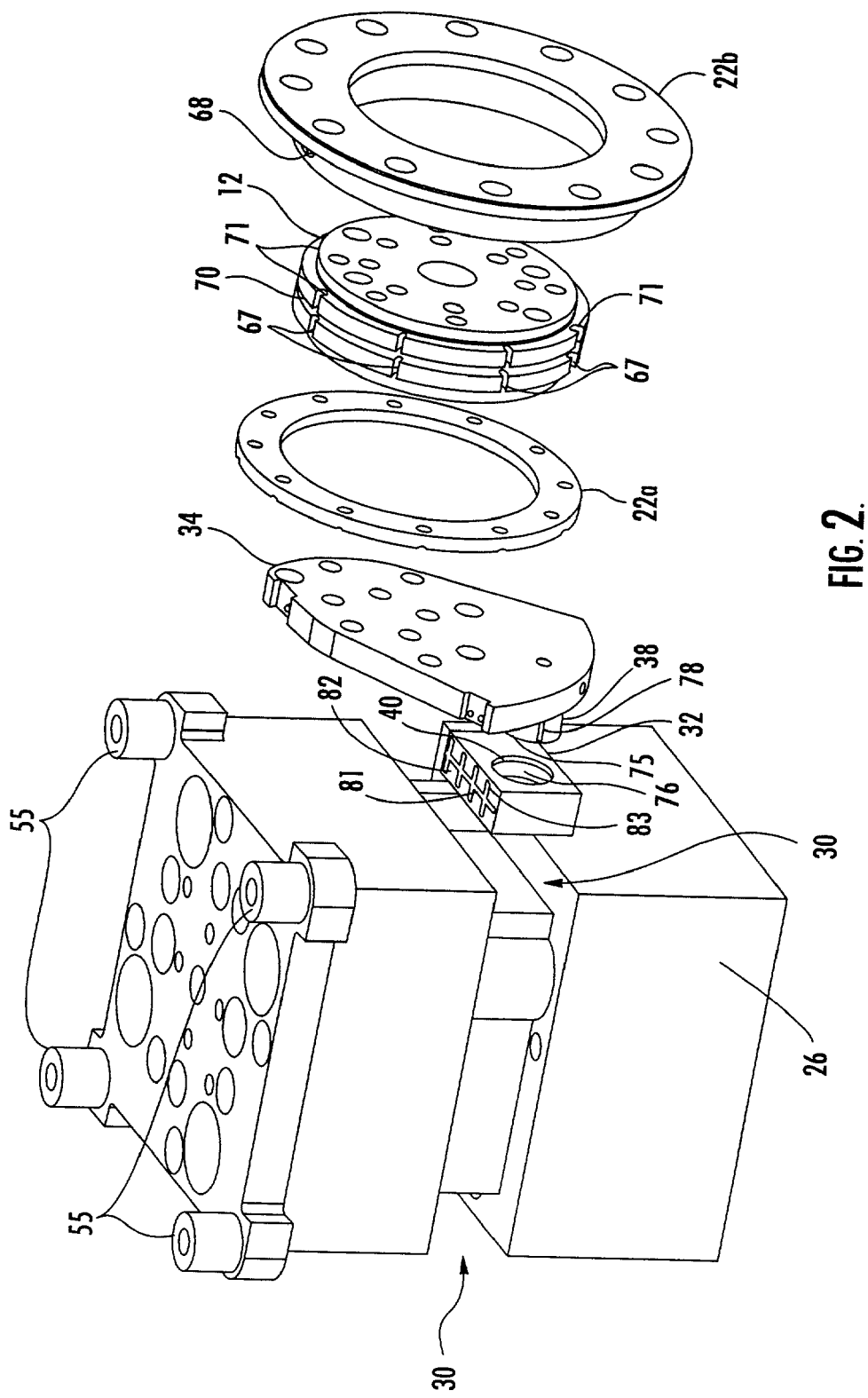
FIGS. 2 through 5 are various exploded perspective views of the tooling fixture, and positions thereof, as shown in FIG. 1.
Figure 3:
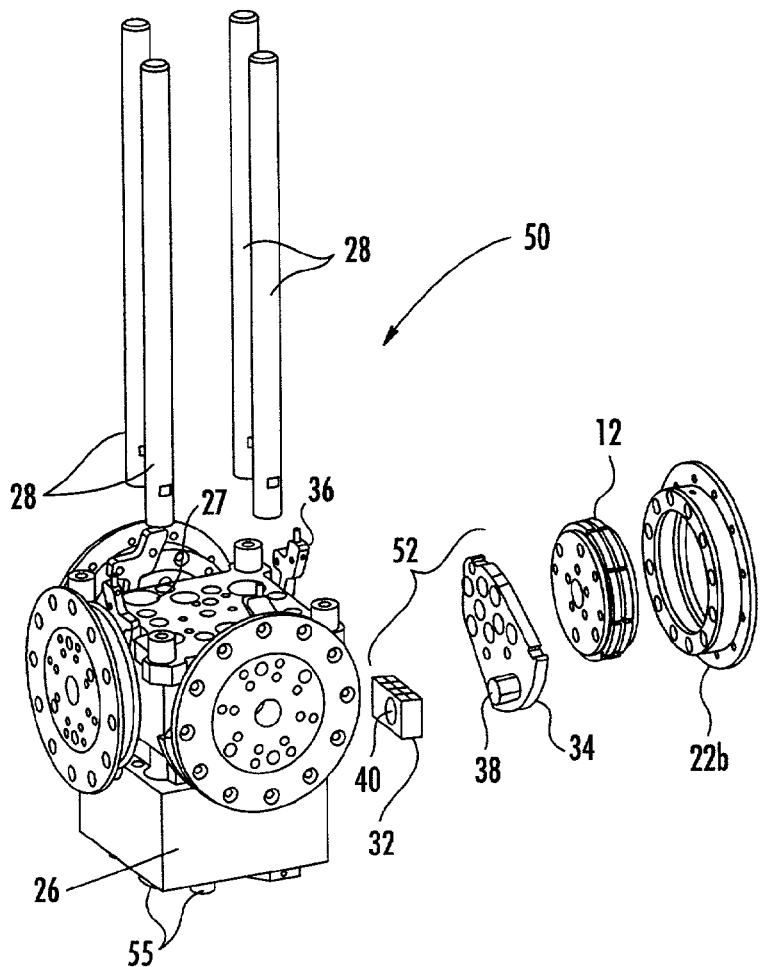
Figure 6:
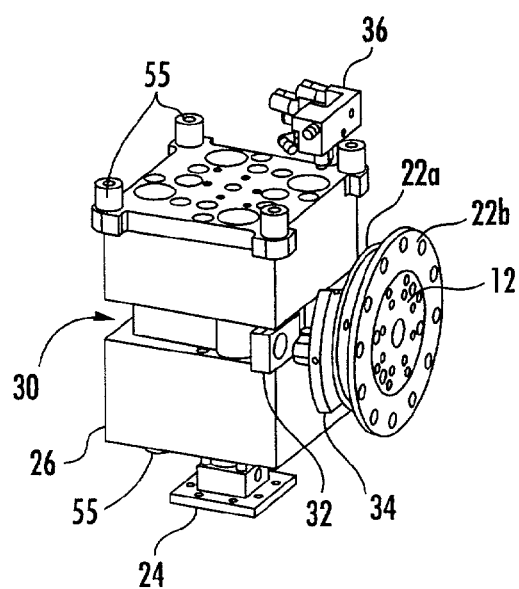
FIG. 6 is a perspective view of portions of the tooling fixture as shown in FIG. 1 with the housing removed and only one spindle shown for clarity.
Figure 4:
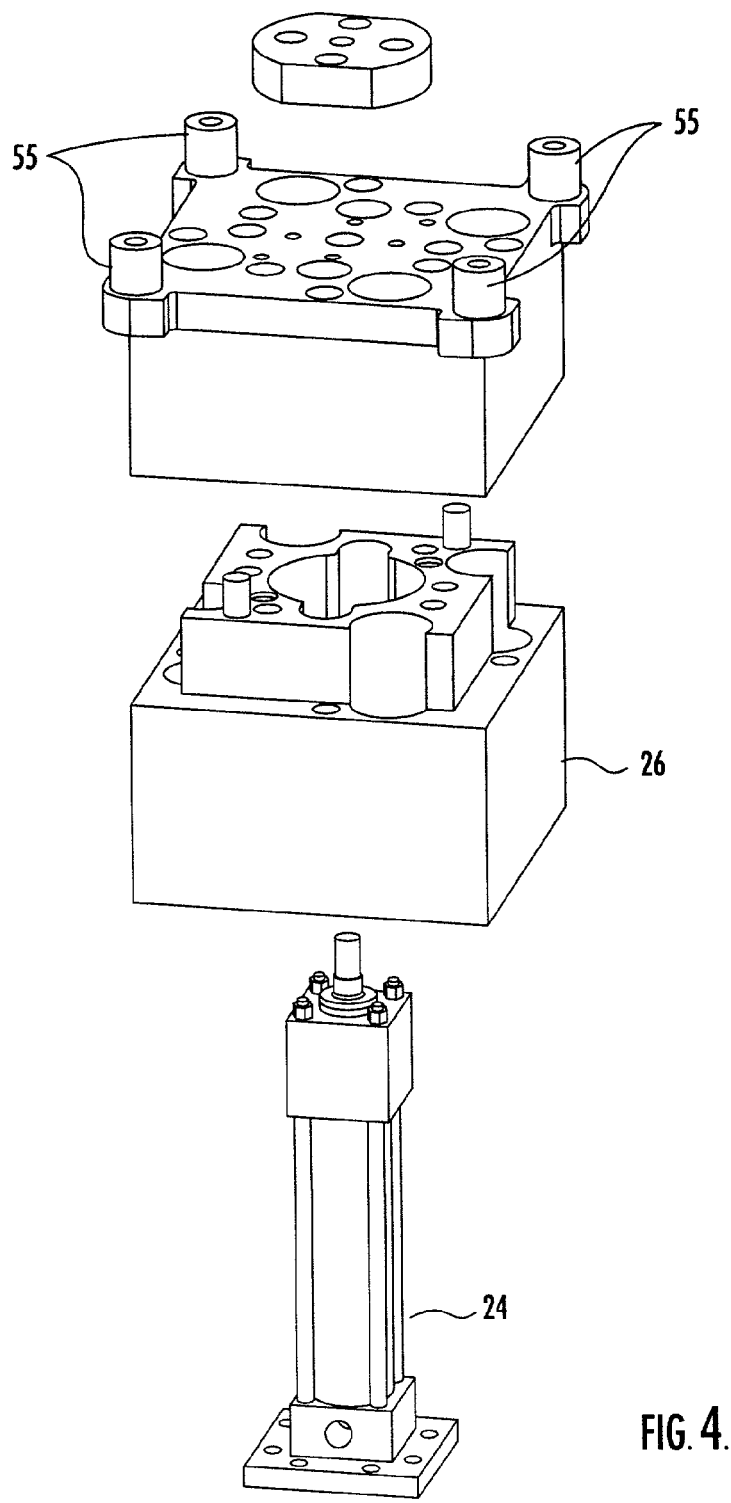
Figure 5:
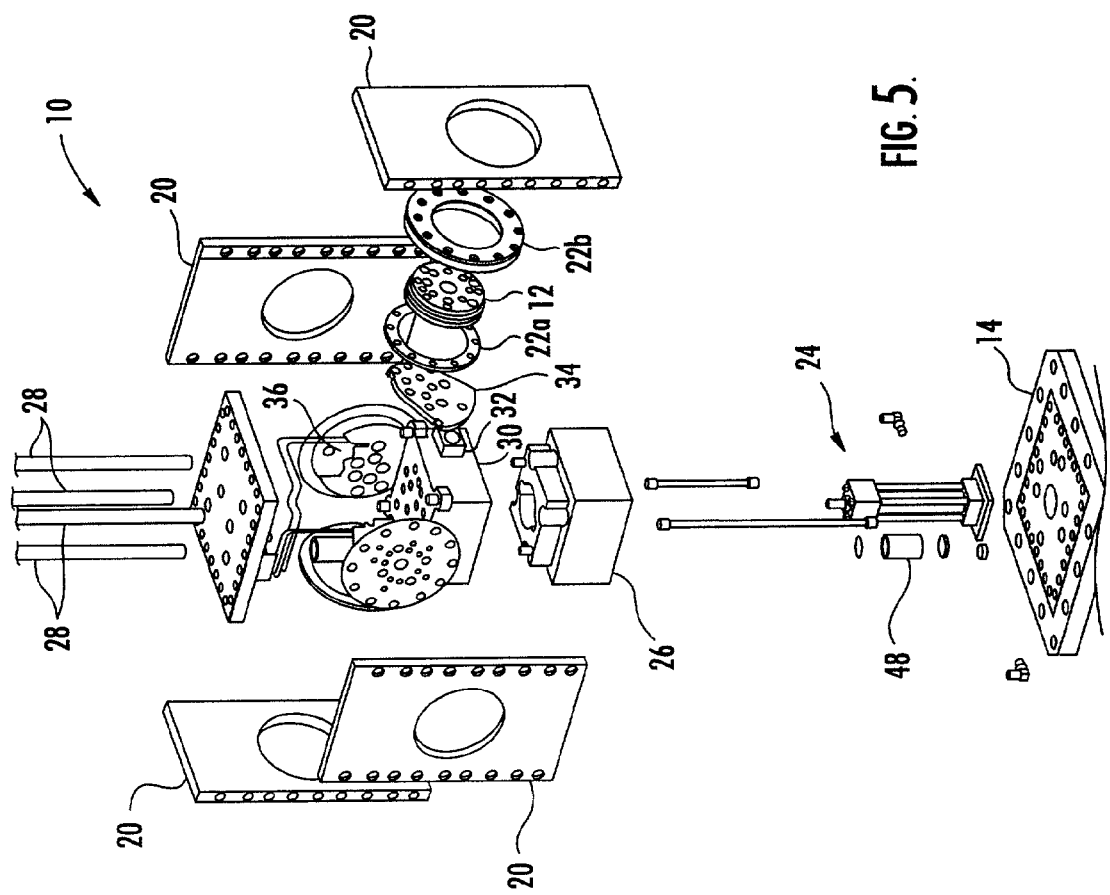
Figure 7:
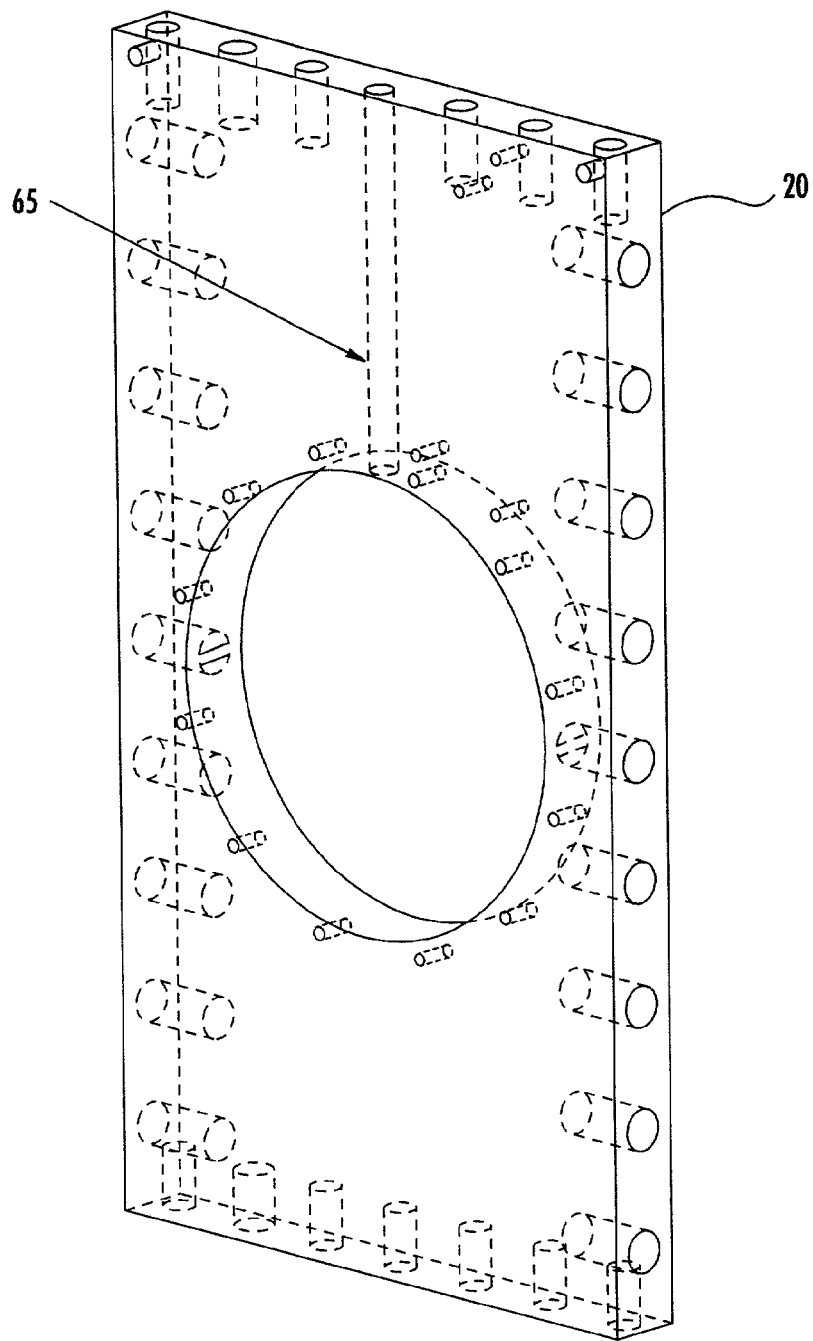
FIG. 7 is a perspective view of portions of the housing of the tooling fixture shown in FIG. 1.

Turning now to FIGS. 2 and 7, the housing 18 includes a plurality of first lubrication passageways 65 extending therein to lubricate the workpiece spindles 12. More specifically, the first lubrication passageway 65 extends from an upper grease fitting, not shown, through a sidewall 20 of the housing 18. Each workpiece spindle 12 may therefore be lubricated without disassembly. The lubricant may be a commonly used grease that is applied to lubricate the workpiece spindles 12 through the first lubrication passageway 65.

The grease is delivered from the lower end of the passageway 65 in the sidewall 20 through an opening 68 in the upper end of the mount 22b and, in turn, into a medial circumferential groove 70. The circumferential groove 70 is crossed by a plurality of transverse grooves 67 to also deliver grease to the grooves 71 on the thrust surfaces. In addition, at the lower portion of each thrust surf-ace groove 71, a small metering opening is provided to permit the escape of air to encourage complete filling of the grooves with grease, before grease then flows from the metering opening, as will be appreciated by those skilled in the art. The grease is typically delivered under pressure and with rotation of the spindle 12 to ensure uniform distribution onto the bearing surfaces as will be appreciated by those skilled in the art.

Each converter member 52 also includes a second lubrication passageway therein for lubricating the spindle drive assembly 50. More particular, a grease fitting, not shown may be provided on a front surface of the crank arm 34 and aligned with a central opening in the spindle 12 to thereby permit access to the fitting. A passageway is drilled transversely through the crank arm 34 to deliver grease to the crank 38. One or more intersecting passageways may also be formed to define one or more radial openings 75 in the crank (FIG. 2). This opening 75 may deliver grease to circumferential grooves 76 in the interior of the opening 40 in the shoe 32, and the transverse grooves 78 on the crank 38.

In addition, upper and lower vertical passageways may be formed in the shoe 32 to deliver grease outwardly to upper and lower openings 81, the upper opening being visible in FIG. 2. These openings 81, in turn, deliver grease to the longitudinal medial groove 82 and transverse grooves 83. As noted above, the transverse grooves 83 and 78 may also terminate in small metering openings to permit air to escape and encourage complete filling as described above. These various passageways and grooves define the second grease passageway for the tooling fixture 10. In other embodiments, the first and second passageways could be interconnected so that all could be supplied grease from a common fitting, for example, as will be appreciated by those skilled in the art.

Another aspect of the tooling fixture 10 is that it may have passive heat expansion compensation built into the design as understood by those skilled in the art. Of course, in other embodiments, active heat compensation may also be included.

Figure 8:
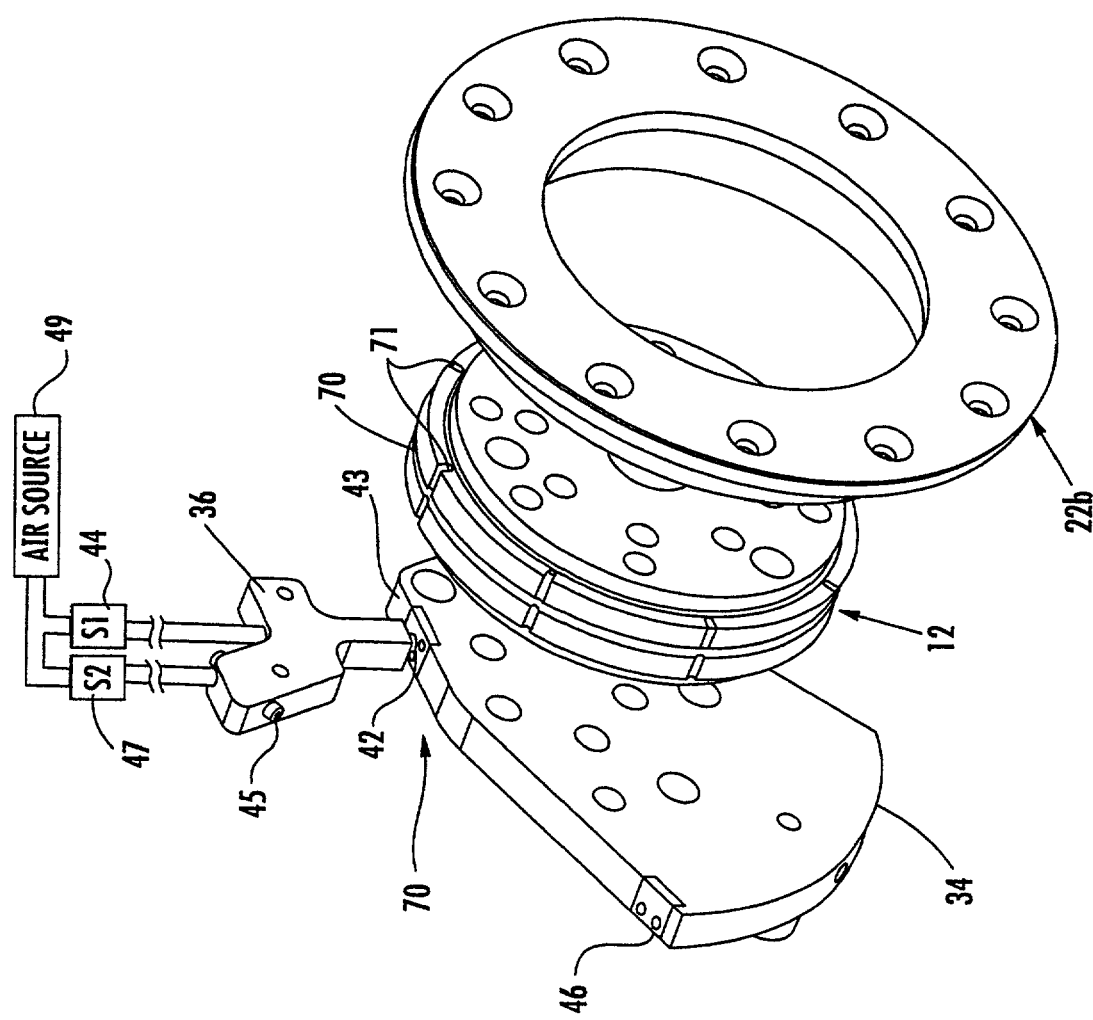
FIGS. 8 and 9 are exploded perspective views of portions of the tooling fixture of FIG. 1 and illustrating the position verification feature thereof.
Figure 9:
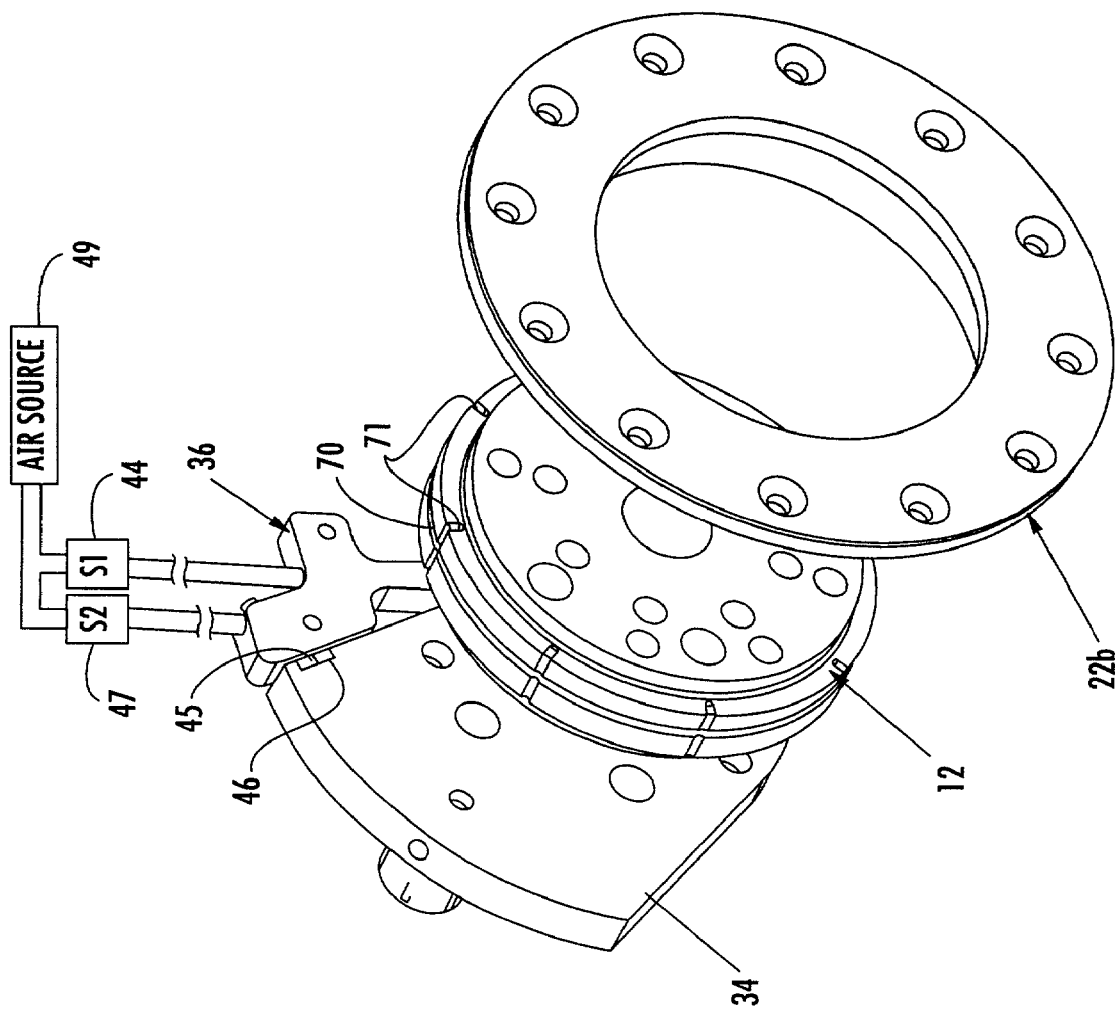

Referring now to FIGS. 8–9, the tooling fixture 10 also includes at least one position sensor 70 for sensing at least one rotational position of the workpiece spindles 12. It is often desirable to be sure the workpiece spindles 12 have rotated to the desired position before performing operations on the workpieces. The position sensor 36 illustratively comprises a pair of fluid nozzles 42, 45 within the housing for directing a flow of fluid outwardly therefrom and toward at least one predetermined portion of the spindle drive assembly 50.

The position sensor 36 also illustratively includes a pair of pressure sensors 44, 47 connected in fluid communication upstream from the fluid nozzles 42, 45. Although the illustrated embodiment includes a pair of fluid nozzles 42, 45 and a pair of pressure sensors, it will be readily understood by those skilled in the art that one fluid nozzle and one pressure sensor may be provided to verify the position of the workpiece spindle 12. The fluid passed through the fluid nozzle may be air, for example, from a regulated or unregulated air source 49. The pressure sensors 44, 47 may be positioned remotely from the tooling fixture 10 in some embodiments as will be appreciated by those skilled in the art. Accordingly, only the relatively straightforward air lines for the nozzles 42, 45 need be connected through a rotary joint to the tooling fixture 10.

FIG. 8 shows the crank arm in a first position wherein a first air nozzle 42 is impeded by an insert block 43. Accordingly, a pressure build-up occurs and an increased pressure is sensed by a first pressure sensor 44. The increased pressure sensed by the first pressure sensor 44 is indicative of the workpiece spindle 12 being in a desired first position.

Similarly, as shown in FIG. 9, when the crank arm 34 is moved to a second position, a second air nozzle 45 is impeded by a second insert 46 carried by the crank arm. Accordingly, a pressure build-up occurs and this pressure is sensed by the second pressure sensor 47. The pressure sensed by the second pressure sensor 47 is indicative of the workpiece spindle 12 being in a second desired position. A series of such sensing arrangements may be provided and respective first nozzles 42 may be connected together in parallel. Likewise, respective second nozzles 45 may also be connected together in parallel. Accordingly, the failure of any one workpiece spindle 12 to be in one of the desired positions can be used to stop further processing until corrected. Of course, in other embodiments of the tooling fixture 10 an electrical sensor, such as a microswitch, for example, could be used to sense the desired positions.

Even though the illustrated embodiment is for horizontal machining centers, the present invention may also be adapted for vertical machining centers as readily appreciated by those skilled in the art.

A method aspect of the present invention includes rotatably positioning a plurality of workpieces secured to workpiece spindles 12 rotatably mounted on a housing 18 of a tooling fixture 10. The method includes moving a body 26 along a predetermined path of travel between first and second spaced-apart positions within the housing 18 and converting movement of the body along the predetermined path of travel into rotation of the workpiece spindles 12. The method further comprises guiding the body 26 along the predetermined path of travel using at least one guide 20 extending within the housing.

Converting may comprise using a crank arm 34 connected to a respective workpiece spindle 12. Converting may also comprise using a shoe 32 movable within at least one recess 30 formed in the body 26 and connected to a second end of a respective crank arm 34.

The method may further include lubricating the workpiece spindles 12 via the first lubrication passageways and lubricating the spindle drive assembly 50 via the second lubrication passageways. The method may further include sensing at least one rotational position of the plurality of workpiece spindles 12. The step of sensing may include positioning at least one fluid nozzle 42 within the housing 18 for directing a flow of fluid outwardly therefrom and toward at least one predetermined portion of the tooling fixture and 10 sensing pressure in the flow of fluid.

The steps of moving and converting may rotate the workpiece spindles 12 in unison through a range of about 90 degrees. The step of moving may also comprise moving the body 26 with at least one actuator 24.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included.

What is claimed is:

1. A tooling fixture for rotatably positioning a plurality of workpieces, the tooling fixture comprising:
   a base;
   a housing carried by said base;
   a plurality of workpiece spindles carried by said housing; and
   a spindle drive assembly for rotatably positioning said workpiece spindles comprising
      a body movable along a predetermined path of travel between first and second spaced-apart positions within said housing, said body having at least one recess therein, and
      a respective converter member for converting movement of said body along the predetermined path of travel into rotation of each workpiece spindle, each converter member comprising a crank arm connected to a respective workpiece spindle and a shoe movable within the at least one recess of said body and connected to an end of a respective crank arm.

2. A tooling fixture according to claim 1 wherein said spindle drive assembly further comprises at least one guide extending within the housing for guiding said body along the predetermined path of travel.

3. A tooling fixture according to claim 1 wherein said at least one recess comprises at least one elongate recess extending transverse to the predetermined path of travel.

4. A tooling fixture according to claim 1 further comprising a plurality of workpiece spindle mounts rotatably mounting respective workpiece spindles to said housing.

5. A tooling fixture according to claim 1 wherein said housing has a plurality of lubrication passageways extending therein to lubricate said workpiece spindles.

6. A tooling fixture according to claim 1 wherein each converter member has a lubrication passageway therein for lubricating said spindle drive assembly.

7. A tooling fixture according to claim 1 wherein said spindle drive assembly drives said workpiece spindles to rotate in unison through a range of about 90 degrees.

8. A tooling fixture according to claim 1 further comprising at least one position sensor for sensing at least one rotational position of said plurality of workpiece spindles.

9. A tooling fixture according to claim 8 wherein said at least one position sensor comprises:
   at least one fluid nozzle within said housing for directing a flow of fluid outwardly therefrom and toward at least one predetermined portion of said spindle drive assembly; and
   at least one pressure sensor connected in fluid communication upstream from said at least one fluid nozzle.

10. A tooling fixture according to claim 1 further comprising an actuator within said housing to move said body along the predetermined path of travel.

11. A tooling fixture according to claim 10 wherein said actuator comprises at least one hydraulic cylinder.

12. A tooling fixture for rotatably positioning a plurality of workpieces, the tooling fixture comprising:
   a base;
   a housing carried by said base;
   a plurality of workpiece spindles carried by said housing;
   a spindle drive assembly for rotatably positioning said workpiece spindles; and
   at least one position sensor for sensing at least one rotational position of said plurality of workpiece spindles and comprising
      at least one fluid nozzle within said housing for directing a flow of fluid outwardly therefrom and toward at least one predetermined portion of said spindle drive assembly, and
      at least one pressure sensor connected in fluid communication upstream from said at least one fluid nozzle.

13. A tooling fixture according to claim 12 further comprising a plurality of workpiece spindle mounts rotatably mounting respective workpiece spindles to said housing.

14. A tooling fixture according to claim 12 wherein said housing has a plurality of lubrication passageways extending therein to lubricate said workpiece spindles.

15. A tooling fixture according to claim 12 wherein said spindle drive assembly drives said workpiece spindles to rotate in unison between first and second rotational positions.

16. A tooling fixture according to claim 15 wherein said at least one position sensor comprises first and second position sensors for each workpiece spindle to sense respective first and second rotational positions thereof.

17. A tooling fixture according to claim 15 wherein the first and second rotational positions are separated by 90 degrees.

18. A tooling fixture according to claim 12 wherein said spindle drive assembly comprises:
   a body movable along a predetermined path of travel between first and second spaced-apart positions within said housing;
   a respective converter member for converting movement of said body along the predetermined path of travel into rotation of each workpiece spindle; and
   at least one guide extending within the housing for guiding said body along the predetermined path of travel.

19. A tooling fixture according to claim 18 wherein each converter member has a lubrication passageway therein for lubricating said spindle drive assembly.

20. A tooling fixture according to claim 18 wherein each converter member comprises a crank arm connected to a respective workpiece spindle.

21. A tooling fixture according to claim 20 wherein said body has at least one recess formed therein; and wherein each converter member further comprises a shoe movable within the at least one recess and connected to an end of the respective crank arm.

22. A tooling fixture according to claim 18 further comprising an actuator within said housing to move said body along the predetermined path of travel.

23. A tooling fixture according to claim 22 wherein said actuator comprises at least one hydraulic cylinder.

24. A tooling fixture for rotatably positioning a plurality of workpieces, the tooling fixture comprising;
   a base;
   a housing carried by said base;
   a plurality of workpiece spindles carried by said housing;

said housing having a plurality of first lubrication passageways extending therein to lubricate respective workpiece spindles; and a spindle drive assembly for rotatably positioning said workpiece spindles, said spindle drive assembly having a plurality of second lubrication passageways therein.

25. A tooling fixture according to claim 24 wherein each workpiece spindle includes at least one groove therein to distribute lubrication from a respective first lubrication passageway.

26. A tooling fixture according to claim 24 further comprising lubricating grease within said first and second lubrication passageways.

27. A tooling fixture according to claim 24 further comprising a plurality of workpiece spindle mounts rotatably mounting respective workpiece spindles to said housing.

28. A tooling fixture according to claim 24 further comprising at least one position sensor for sensing at least one rotational position of said plurality of workpiece spindles.

29. A tooling fixture according to claim 24 wherein said spindle drive assembly drives said workpiece spindles to rotate in unison through a range of about 90 degrees.

30. A tooling fixture according to claim 24 wherein said spindle drive assembly further comprises:

a body movable along a predetermined path of travel between first and second spaced-apart positions within said housing;

a respective converter member for converting movement of said body along the predetermined path of travel into rotation of each workpiece spindle; and at least one guide extending within the housing for guiding said body along the predetermined path of travel;

each converter member having a respective second lubrication passageway therein.

31. A tooling fixture according to claim 30 further comprising an actuator within the housing to move said body along the predetermined path of travel.

32. A tooling fixture according to claim 30 wherein each converter member comprises a crank arm connected to a respective workpiece spindle.

33. A tooling fixture according to claim 32 wherein said body has at least one recess formed therein; and wherein each converter member further comprises a shoe movable within the at least one recess and connected to an end of a respective crank arm.

34. A tooling fixture according to claim 33 wherein said at least one recess comprises at least one elongate recess extending transverse to the predetermined path of travel.

35. A tooling fixture for rotatably positioning a plurality of workpieces, the tooling fixture comprising:

a base;

a housing carried by said base;

a plurality of workpiece spindles carried by said housing; and a spindle drive assembly for rotatably positioning said workpiece spindles comprising a body movable along a predetermined path of travel between first and second spaced-apart positions within said housing, at least one hydraulic cylinder within said housing for moving said body along the predetermined path of travel, and a respective converter member for converting movement of said body along the predetermined path of travel into rotation of each workpiece spindle.

36. A tooling fixture according to claim 35 wherein said spindle drive assembly further comprises at least one guide extending within the housing for guiding said body along the predetermined path of travel.

37. A tooling fixture according to claim 35 further comprising a plurality of workpiece spindle mounts rotatably mounting respective workpiece spindles to said housing.

38. A tooling fixture according to claim 35 wherein said spindle drive assembly drives said workpiece spindles to rotate in unison through a range of about 90 degrees.

39. A tooling fixture according to claim 35 wherein each converter member comprises a crank arm connected to a respective workpiece spindle.

40. A tooling fixture according to claim 39 wherein said body has at least one recess formed therein; and wherein each converter member further comprises a shoe movable within the at least one recess and connected to an end of a respective crank arm.

41. A tooling fixture according to claim 40 wherein said at least one recess comprises at least one elongate recess extending transverse to the predetermined path of travel.

* * * * *